United States Patent
Han et al.

(10) Patent No.: US 9,370,066 B2
(45) Date of Patent: Jun. 14, 2016

(54) LIGHT EMITTING DEVICE INCLUDING LIGHT EMITTING DIODE AND DRIVING METHOD THEREOF

(71) Applicant: SAMSUNG DISPLAY CO., LTD., Yongin, Gyeonggi-do (KR)

(72) Inventors: Song Yi Han, Asan-si (KR); Tae Gon Im, Siheung-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 38 days.

(21) Appl. No.: 14/255,108

(22) Filed: Apr. 17, 2014

(65) Prior Publication Data

US 2015/0156836 A1 Jun. 4, 2015

(30) Foreign Application Priority Data

Nov. 29, 2013 (KR) ........................ 10-2013-0147625

(51) Int. Cl.
*H05B 37/00* (2006.01)
*H05B 33/08* (2006.01)

(52) U.S. Cl.
CPC ........ *H05B 33/0827* (2013.01); *H05B 33/0812* (2013.01); *Y02B 20/345* (2013.01)

(58) Field of Classification Search
CPC ... H05B 37/036; H05B 37/02; H05B 33/0815
USPC ...... 315/185 R, 186, 192, 291, 294, 297, 307
See application file for complete search history.

(56) References Cited

U.S. PATENT DOCUMENTS

| | | | |
|---|---|---|---|
| 6,816,002 B2 | 11/2004 | Bruck | |
| 7,115,888 B2 | 10/2006 | Hachiya et al. | |
| 7,609,106 B2 | 10/2009 | Watanabe | |
| 8,077,139 B2* | 12/2011 | Chang | H05B 33/0818 315/185 R |
| 8,120,283 B2 | 2/2012 | Tanaka et al. | |
| 2004/0124889 A1 | 7/2004 | Koharagi et al. | |
| 2009/0134817 A1* | 5/2009 | Jurngwirth | H05B 33/0851 315/307 |
| 2009/0146584 A1 | 6/2009 | Ye et al. | |
| 2009/0261743 A1* | 10/2009 | Chen | H05B 33/0827 315/192 |
| 2010/0148691 A1* | 6/2010 | Kuo | H05B 33/0815 315/291 |
| 2011/0062872 A1* | 3/2011 | Jin | H05B 33/0818 315/122 |
| 2011/0084619 A1* | 4/2011 | Gray | H05B 33/0824 315/185 R |

(Continued)

FOREIGN PATENT DOCUMENTS

| | | |
|---|---|---|
| JP | 4772366 | 7/2011 |
| KR | 10-2013-0018065 | 2/2013 |
| WO | 2004057924 | 7/2004 |

OTHER PUBLICATIONS

European Search Report dated Aug. 28, 2015 in corresponding European Patent Application No. 14167140.4.

*Primary Examiner* — Jason M Crawford
(74) *Attorney, Agent, or Firm* — F. Chau & Associates, LLC (57) ABSTRACT

A light emitting device includes a light emitting unit and a constant current controller. The light emitting unit includes at least one LED string. The constant current controller is connected to a cathode terminal of the LED string and controls a driving current flowing through the LED string. The constant current controller includes a transistor connected to the cathode terminal of the LED string. A switching unit and a sensing resistor are connected to the transistor. The switching unit connects and disconnects between the sensing resistor and the transistor.

20 Claims, 8 Drawing Sheets

(56) References Cited

U.S. PATENT DOCUMENTS

| | | | | |
|---|---|---|---|---|
| 2012/0119677 A1* | 5/2012 | Serdarevic | ......... | H05B 33/0812 315/307 |
| 2012/0181939 A1* | 7/2012 | Szczeszynski | ..... | H05B 33/0815 315/186 |
| 2013/0038227 A1* | 2/2013 | Yan | .................... | H05B 33/0818 315/186 |
| 2013/0114016 A1* | 5/2013 | Lim | .................... | H05B 33/0827 349/43 |
| 2013/0278166 A1 | 10/2013 | Katoh | | |
| 2013/0293109 A1 | 11/2013 | Cheon et al. | | |

* cited by examiner

LIGHT EMITTING DEVICE INCLUDING LIGHT EMITTING DIODE AND DRIVING METHOD THEREOF

CROSS-REFERENCE TO RELATED APPLICATION

This application claims priority to Korean Patent Application No. 10-2013-0147625 filed in the Korean Intellectual Property Office on Nov. 29, 2013, the disclosure of which is incorporated by reference herein in its entirety.

TECHNICAL FIELD

Exemplary embodiments of the present invention relate to a light emitting device, and more specifically, to a light emitting device including light emitting diodes and a method of driving the same.

DISCUSSION OF THE RELATED ART

Non-emission display devices, e.g., LCDs, include a backlight unit for supplying light to a display panel. The backlight unit may adopt at least one light emitting diode (LED) string as a light source generating light. The LED string includes a plurality of LEDs that are connected in series to each other. The luminance of the backlight unit may be controlled by an LED driver. Heat is generated when current for driving the LED string flows through the sensing resistor. To reduce heat generation, a plurality of relatively bulky sensing resistors connected in parallel with each other may be used, but may lead to the LED driver being more complicated and causing unnecessary power consumption.

SUMMARY

An exemplary embodiment of the present invention provides a light emitting device. The light emitting device includes a light emitting unit. The light emitting unit includes at least one LED string. A constant current controller is connected to a cathode terminal of the LED string and controls a driving current flowing through the LED string. The constant current controller includes a transistor connected to the cathode terminal of the LED string. A switching unit and a sensing resistor are connected to the transistor. The switching unit connects and disconnects between the sensing resistor and the transistor The constant current controller may further include a first operational amplifier including an output terminal connected to a base of the transistor.

The first operational amplifier may further include an inversion terminal connected to an emitter of the transistor and a non-inversion terminal connected to a reference voltage terminal.

The switching unit may be periodically switched.

The switching unit may include a first switching element connected between the emitter of the transistor and a ground voltage terminal.

The switching unit may further include a pulse generator periodically applying a pulse signal to a gate of the first switching element.

The switching unit may further include an AND gate receiving a pulse signal of the pulse generator and a signal synchronized with a dimming signal from an external pulse width modulator. An output of the AND gate may be input to the gate of the first switching element.

The switching unit may further include a power input unit applying a power voltage to the pulse generator. The power input unit may include a second switching element connected to the pulse generator. A control signal synchronized with a dimming signal may be input to a gate of the second switching element.

The switching unit may control a current to flow through the sensing resistor when a voltage at the emitter of the transistor departs from a predetermined voltage range or is different from a predetermined voltage.

The switching unit may include a third switching element connected between the emitter of the transistor and the inversion terminal of the first operational amplifier. A fourth switching element is connected between the emitter of the transistor and a ground voltage terminal. A second operational amplifier has an output terminal connected to a gate of the fourth switching element.

Channel types of the third switching element and the fourth switching element may be different from each other.

A non-inversion terminal of the second operational amplifier may be connected with the reference voltage terminal, and an inversion terminal of the second operational amplifier may be connected to the emitter of the transistor.

The third switching element may be an NMOSFET, and the fourth switching element may be a PMOSFET.

The light emitting device may further include a DC_DC converter applying a driving voltage to an anode terminal of the LED string.

An exemplary embodiment of the present invention provides a method of driving a light emitting device. The light emitting device includes a light emitting unit including at least one LED string. A constant current controller is connected to a cathode terminal of the LED string. In the method, a driving current is rendered to flow through the LED string by applying a driving voltage to an anode terminal of the LED string. A constant current control on the driving current is performed during a first period. The constant current control on the driving current is stopped during a second period. The first period and the second period may be alternately repeated.

The first period and the second period may be periodically repeated.

The constant current controller may include a transistor connected to the cathode terminal of the LED string. A switching unit and a sensing resistor are connected to the transistor. A current may flow through the sensing resistor during the first period, and might not flow through the sensing resistor during the second period.

The first period and the second period may be aperiodically repeated.

The constant current controller may include a transistor connected to the cathode terminal of the LED string. A switching unit and a sensing resistor are connected to the transistor. A current may flow through the sensing resistor during the first period, and might not flow through the sensing resistor during the second period.

According to an exemplary embodiment of the present invention, a light emitting device comprises a light source and a current controller. The current controller includes a transistor connected to a terminal of the light source, a sensing resistor, and a switching unit connected between the transistor and the sensing resistor. The switching unit is configured to connect the transistor to the sensing resistor or a ground depending on a dimming signal. The current controller is configured to enable a substantially constant current to flow through the light source regardless of whether the switching unit connects the transistor to the sensing resistor or the ground.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. The same reference numerals may be used to denote the same or substantially the same elements throughout the specification and the drawings. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
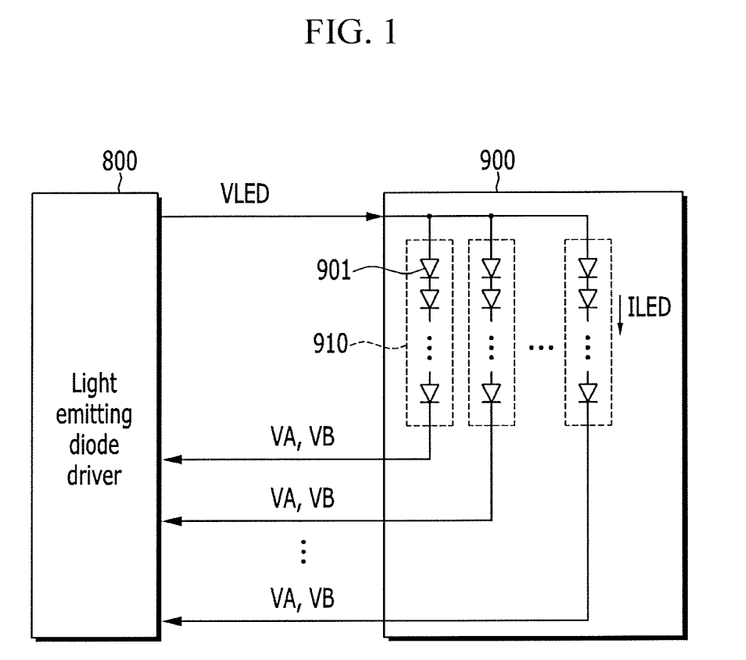
FIG. 1 is a block diagram of a light emitting device according to an exemplary embodiment of the present invention.

FIG. 1 is a block diagram of a light emitting device according to an exemplary embodiment of the present invention.

Referring to FIG. 1, a light emitting device according to an exemplary embodiment of the present invention includes a light emitting diode driver 800 and a light emitting unit 900.

The light emitting unit 900 includes one or more light emitting diode strings (LED strings) 910 which are connected in parallel to each other. Each of the LED string 910 includes a plurality of light emitting diodes 901 which are connected in series to each other.

Each LED string 910 emits light with a luminance according to a driving current ILED that is generated by a voltage difference between an anode terminal and a cathode terminal. The voltage differences between anode terminals and cathode terminals of the LED strings 910 may be the same as or different from each other.

The light emitting diode driver 800 drives the light emitting unit 900. The light emitting diode driver 800 generates a light emitting diode driving voltage VLED, and applies the light emitting diode driving voltage VLED to the anode terminal of each LED string 910.

The light emitting diode driver 800 is connected to the cathode terminal of each LED string 910 and controls the driving current ILED of each LED string 910. The light emitting diode driver 800 may control the driving current ILED flowing through the LED string 910 based on voltages VA and VB at, at least, one of the cathode terminals of the LED strings 910, information on a target light emitting diode driving current which may be controlled in or outside the LED strings 910.

Figure 2:
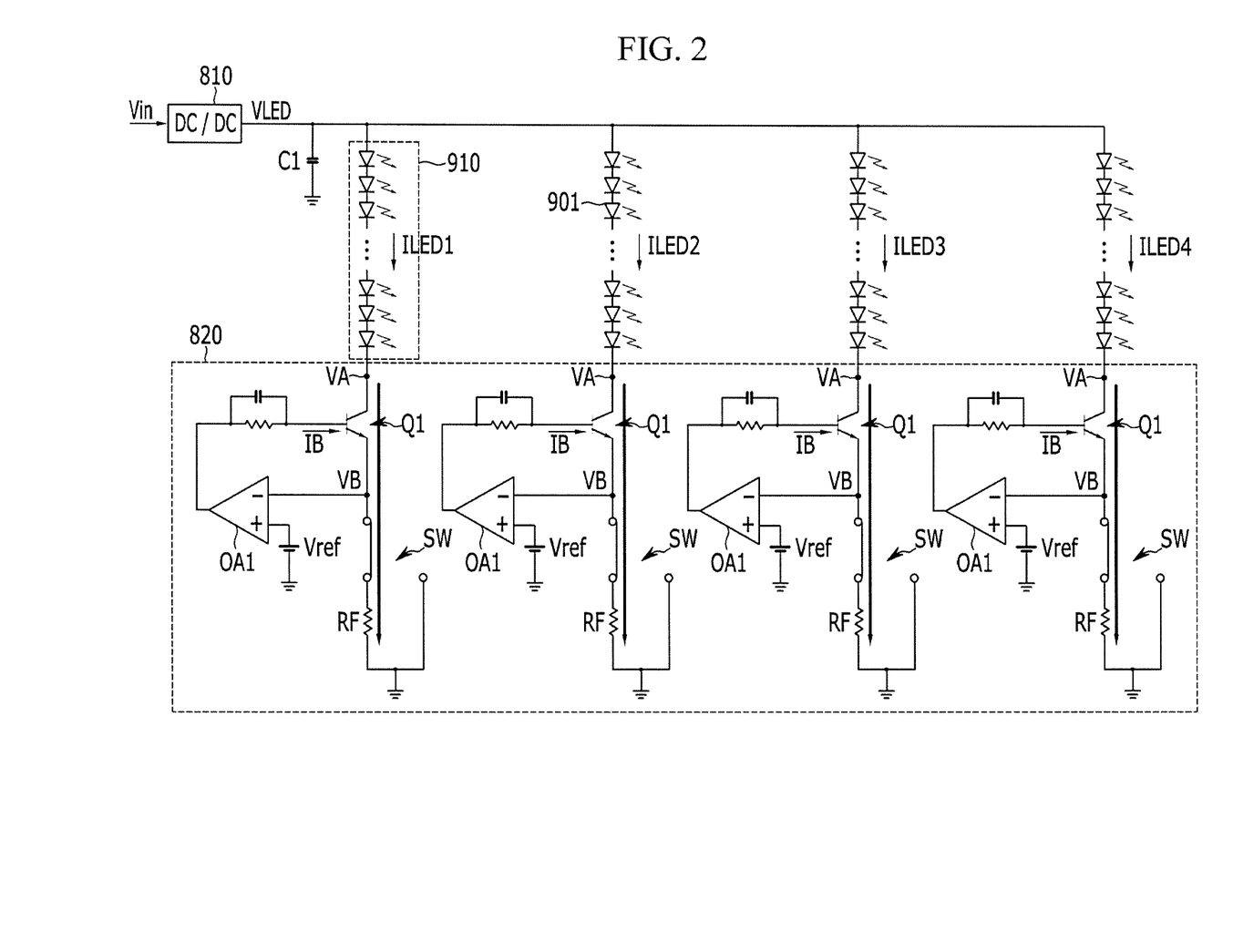
FIG. 2 is a circuit diagram of a light emitting diode driver according to an exemplary embodiment of the present invention.
Figure 3:
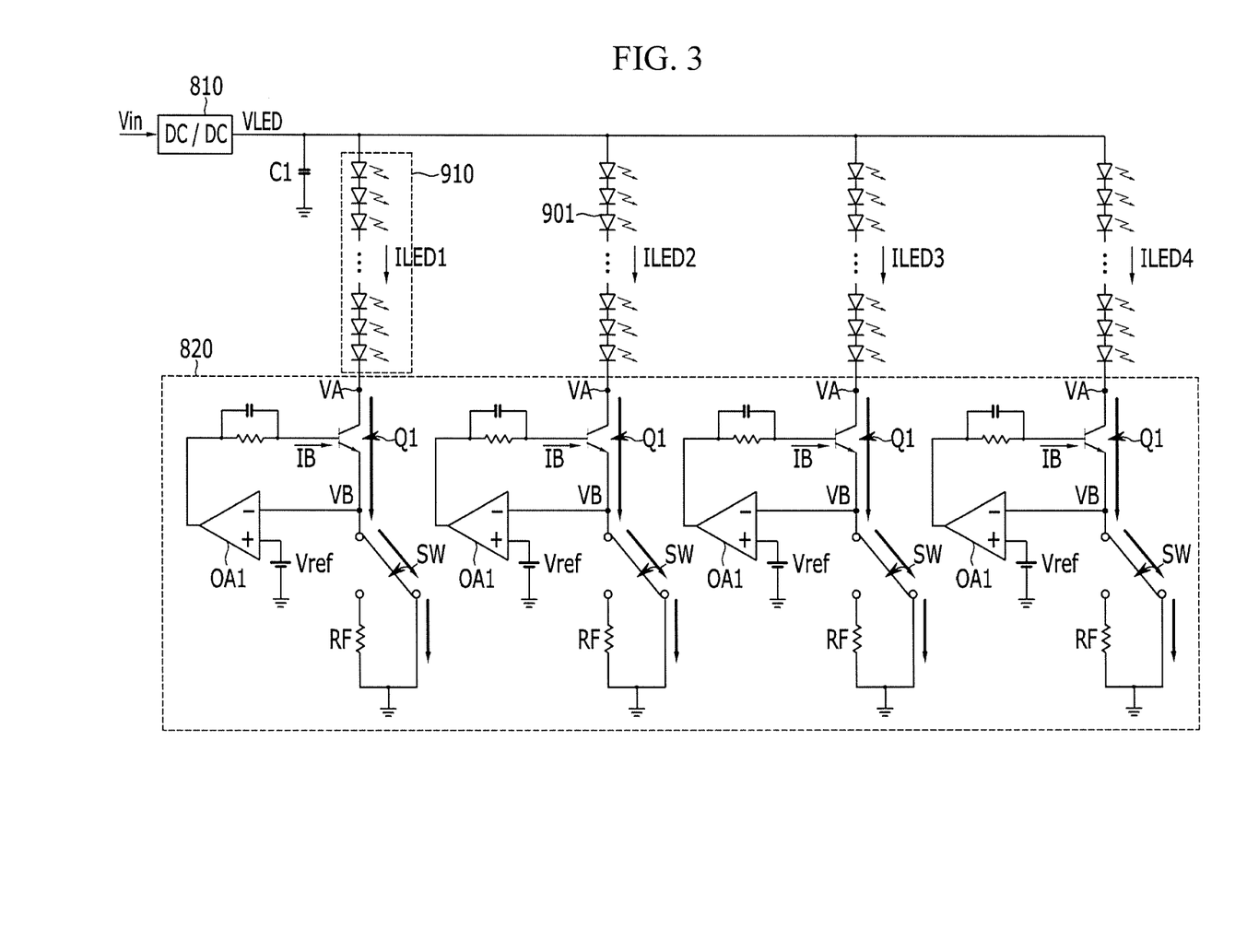
FIG. 3 is a circuit diagram for a state of a light emitting diode driver illustrated in FIG. 2, according to an exemplary embodiment of the present invention.

FIG. 2 is a circuit diagram of a light emitting diode (LED) driver according to an exemplary embodiment of the present invention, and FIG. 3 is a circuit diagram for a state of a light emitting diode driver illustrated in FIG. 2, according to an exemplary embodiment of the present invention.

Referring to FIGS. 2 and 3, the light emitting diode driver 800 according to an exemplary embodiment of the present invention includes a DC-DC converter 810 and a constant current controlling unit 820. In an exemplary embodiment of the present invention, as illustrated in FIGS. 2 and 3, four LED strings 910 are used, but the number of LED strings 910 is not limited thereto.

The DC-DC converter 810 is connected to the anode terminal of each LED string 910. The DC-DC converter 810 receives an input voltage Vin, generates a light emitting diode driving voltage VLED, and inputs the generated light emitting diode driving voltage VLED to the anode terminal of each LED string 910.

A voltage VA at the cathode terminal of each LED string 910 is fed back to the DC-DC converter 810, and the DC-DC converter 810 generates a light emitting diode driving voltage VLED based on the fed-back voltage VA. Power consumed in each LED string 910 may be slightly different from power consumed in another LED string 910, and a voltage VA (referred to as a "head-room voltage") at the cathode terminal of each LED string 910 may be different from a voltage VA at the cathode terminal of another LED string 910. The DC-DC converter 810 may control the light emitting diode driving voltage VLED based on a lowest head-room voltage VA, and such control is referred to as head-room control.

An output terminal of the DC-DC converter 810 may be connected to a capacitor C1.

The constant current controller 820 may include transistors Q1 each connected to the cathode terminal of each LED string 910, operational amplifiers OA1, switching units SW, and sensing resistors RF.

The transistor Q1 is a three-terminal transistor including a base connected to the output terminal of the operational amplifier OA1, a collector connected to the cathode terminal of the LED string 910, and an emitter connected to an inversion terminal of the operational amplifier OA1 and the sensing resistor RF.

The transistor Q1 according to an exemplary embodiment of the present invention may be a bipolar junction transistor (hereinafter, referred to as a "BJT") and a metal-oxide-semiconductor field-effect transistor (hereinafter, referred to as an "MOSFET"), as illustrated in FIGS. 2 and 3. The transistor Q1 is driven in a linear region and controls an impedance between the collector and emitter and thus constantly maintains driving currents ILED1, ILED2, ILED3, and ILED4 of the LED strings 910. The transistor Q1 according to an exemplary embodiment of the present invention is of an NPN type, which has a P-type base and an N-type emitter and collector, but is not limited thereto.

The operational amplifier OA1 may be a differential amplifier, and the operational amplifier OA1 may amplify a difference between a reference voltage Vref and a voltage VB at the emitter of the transistor Q1. The operational amplifier OA1 includes a non-inversion terminal (+), an inversion terminal (−), and an output terminal. The reference voltage Vref may be input to the non-inversion terminal (+) of the operational amplifier OA1, and the voltage VB at the emitter of the transistor Q1 may be input to the inversion terminal (−) of the operational amplifier OA1. The output terminal of the operational amplifier OA1 is connected to the base of the transistor Q1.

The operational amplifier OA1 adjusts the impedance between the collector and emitter of the transistor Q1, for example, a collector-emitter voltage VCE of the transistor Q1 by adjusting a current IB applied to the base of the transistor Q1 based on the reference voltage Vref and the voltage VB at the emitter of the transistor Q1, uniformly controlling the driving currents ILED1, ILED2, ILED3, and ILED4 of the LED strings 910.

A resistor and a capacitor may be connected in parallel to each other between the operational amplifier OA1 and the transistor Q1, and the resistor and the capacitor, respectively, may be a parasitic capacitor and a parasitic resistor. The resistor and the capacitor connected between the operational amplifier OA1 and the transistor Q1 may be omitted.

The reference voltage Vref applied to the non-inversion terminal (+) of the operational amplifier OA1 may be constant or changed.

The switching unit SW is connected to the emitter of the transistor Q1 and the sensing resistor RF. The switching unit SW may connect and disconnect between the emitter of the transistor Q1 and the sensing resistor RF according to a switch control signal, as illustrated in FIGS. 2 and 3. For example, the switching unit SW is connected to the emitter of the transistor Q1 and the sensing resistor RF and enables current to flow or stop flowing across the sensing resistor RF.

The sensing resistor RF is connected between the switching unit SW and the reference voltage such as a ground voltage. The sensing resistor RF may determine the amplitude of the current flowing in the transistor Q1, for example, driving current ILED1, ILED2, ILED3, or ILED4 of the LED strings 910.

As illustrated in FIG. 2, when the switching unit SW connects the emitter of the transistor Q1 with the sensing resistor RF (hereinafter, referred to as a "constant current controlling period"), the driving current ILED1, ILED2, ILED3, or ILED4 flowing through the transistor Q1 flow to the sensing resistor RF, generating heat and consuming power.

As illustrated in FIG. 3, when the switching unit SW disconnects the emitter of the transistor Q1 from the sensing resistor RF and connects the emitter of the transistor Q1 with the ground voltage terminal (hereinafter, referred to as a "constant current not-controlling period"), the driving current ILED1, ILED2, ILED3, or ILED4 does not flow to the sensing resistor RF, but to the ground voltage terminal, and thus, no heat is generated in the sensing resistor RF, and no power is consumed. In the constant current not-controlling period, the voltage VA at the cathode terminal of the LED string 910 controlled in the previous constant current controlling period is maintained, and accordingly, the driving currents ILED1, ILED2, ILED3, or ILED4 may constantly flow through the LED strings 910.

The DC-DC converter 810 and the constant current controller 820 according to an exemplary embodiment of the present invention may be included in one IC chip.

Figure 4:
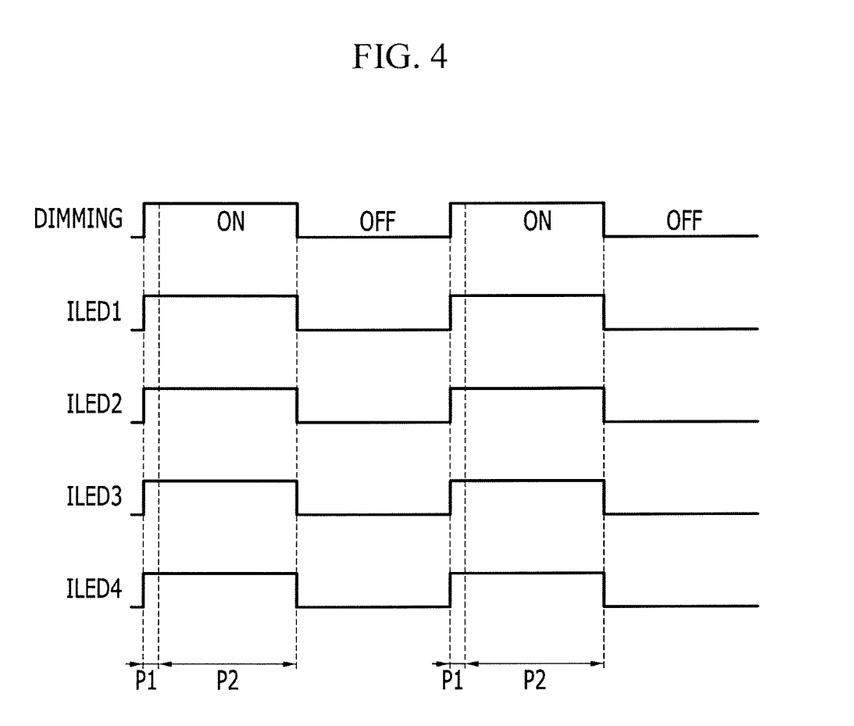
FIG. 4 is a timing diagram of a dimming signal of a light emitting diode driver and a driving current of each light emitting diode string according to an exemplary embodiment of the present invention.

FIG. 4 is a timing diagram of a dimming signal of a light emitting diode driver and a driving current of each light emitting diode string according to an exemplary embodiment of the present invention.

The light emitting diode driver 800 according to an exemplary embodiment of the present invention may operate according to a dimming signal to control luminance of the light emitting diodes 901. The dimming signal includes an on period and an off period which are periodically repeated, and an ON/OFF duty ratio may be controlled according to a target luminance. When the dimming signal is turned on, the driving currents ILED1, ILED2, ILED3, and ILED4 flow through the light emitting diodes 901, causing the light emitting diodes 901 to emitting light.

A light emitting period when the driving currents ILED1, ILED2, ILED3, and ILED4 flow through the light emitting diodes 901 to emit light includes at least one constant current controlling period P1 and a constant current not-controlling period P2. As shown in FIG. 4, the constant current controlling period P1 is positioned at an initial stage of each light emitting period, and the constant current not-controlling period P2 is positioned after the constant current controlling period P1. However, exemplary embodiments of the present invention are not limited thereto. Alternatively, the constant current controlling period P1 may be positioned in the middle of the light emitting period. According to an exemplary embodiment of the present invention, a plurality of constant current controlling periods P1 which are temporally spaced apart from each other may be positioned in one light emitting period, and a plurality of constant current not-controlling periods P2 may be positioned between the plurality of constant current controlling periods P1.

Since the operational amplifier OA1 performs a constant current controlling operation in the constant current controlling period P1, the driving currents ILED1, ILED2, ILED3, and ILED4 flowing through the LED strings 910 may be constantly controlled. In the constant current not-controlling period P2, the voltage VA at the cathode terminal of the LED string 910 controlled in the previous constant current controlling period P1 may be substantially maintained, and thus, the driving currents ILED1, ILED2, ILED3, and ILED4 may substantially constantly flow through the LED strings 910.

The driving currents ILED1, ILED2, ILED3, and ILED4 in the constant current not-controlling period P2 are substantially the same or slightly different from the driving currents ILED1, ILED2, ILED3, and ILED4, respectively, in the constant current controlling period P1. However, the duration and ratio of the constant current controlling period P1 and the constant current not-controlling period P2 may be controlled, allowing changes in the driving currents ILED1, ILED2, ILED3, and ILED4 in the constant current not-controlling period P2 to be unnoticeable to an observer.

The light emitting diodes 901 experience a tiny voltage change unlike other light sources, such as cold cathode fluorescent lamps (CCFLs), and thus, despite the intermittent constant current controlling periods P1, no luminance change in the light emitting diodes 901 might be noticeable to the observer.

The duration of the constant current controlling period P1 may be constant or changed in real time. The duration of the constant current controlling period P1 may be shorter than the duration of the constant current not-controlling period P2.

According to an exemplary embodiment of the present invention, since the constant current control is performed for only a predetermined time, the current does not always flow through the sensing resistor RF. Accordingly, heat generated in the sensing resistor RF may be reduced, and unnecessary power consumption may be prevented. To increase the efficiency and reduce the heat generated in the light emitting diode driver 800, the duration of the constant current controlling period P1 may be controlled to be maximally shortened.

In preventing heat generation in the sensing resistor RF, rather than a plurality of relatively bulky resistors connected in parallel to each other, a single small-size resistor may configure the sensing resistor RF. Accordingly, the circuit of the light emitting diode driver 800 may be simplified, and the sensing resistor RF may be embedded in the IC chip.

Further, since the constant current controlling period P1 may be maximally shortened, the efficiency of the light emitting diode driver 800 may be increased.

Figure 5A:
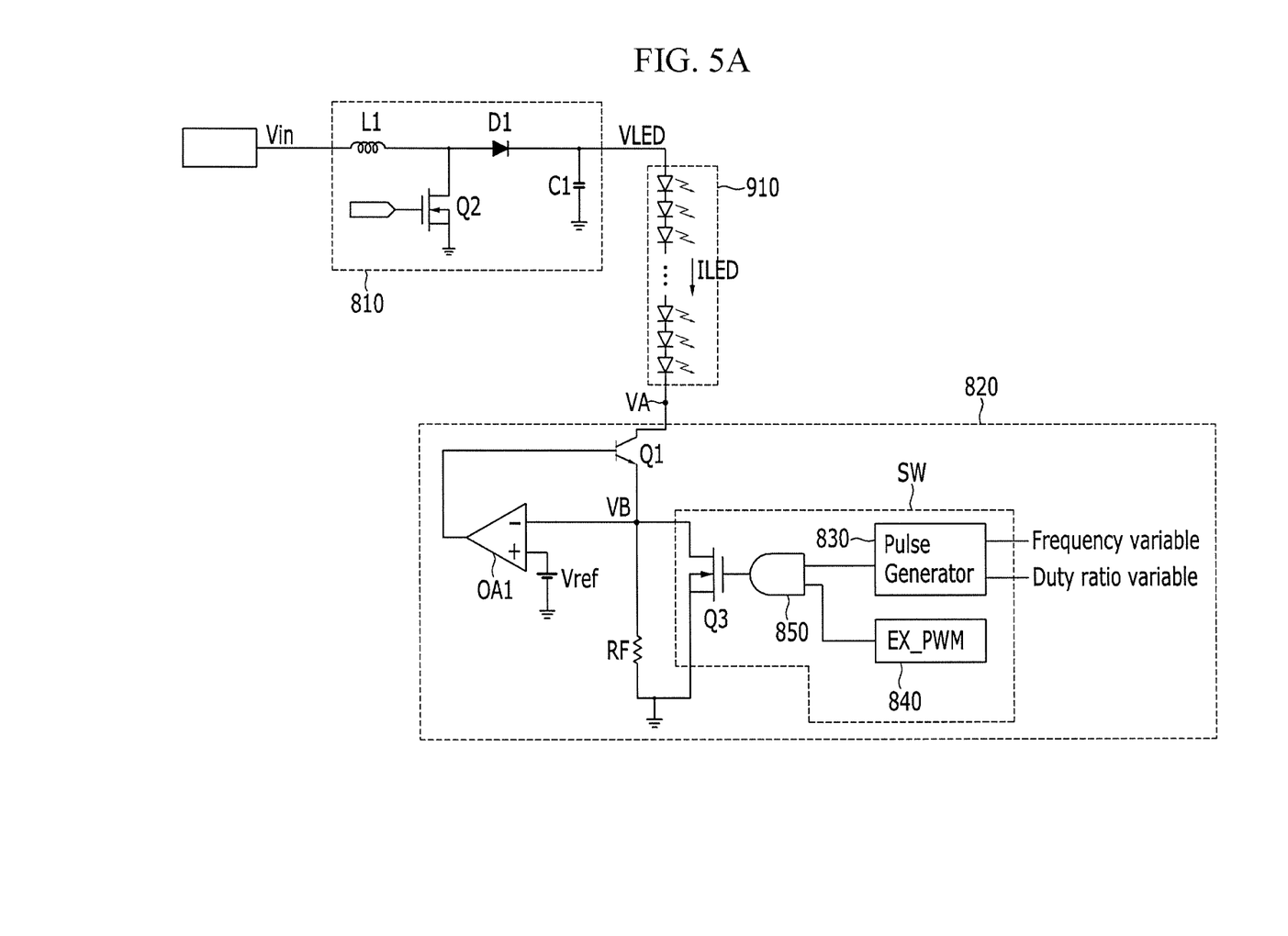
FIGS. 5A, 5B, and 6 are circuit diagrams of a light emitting diode driver according to an exemplary embodiment of the present invention, according to an exemplary embodiment of the present invention.
Figure 5B:
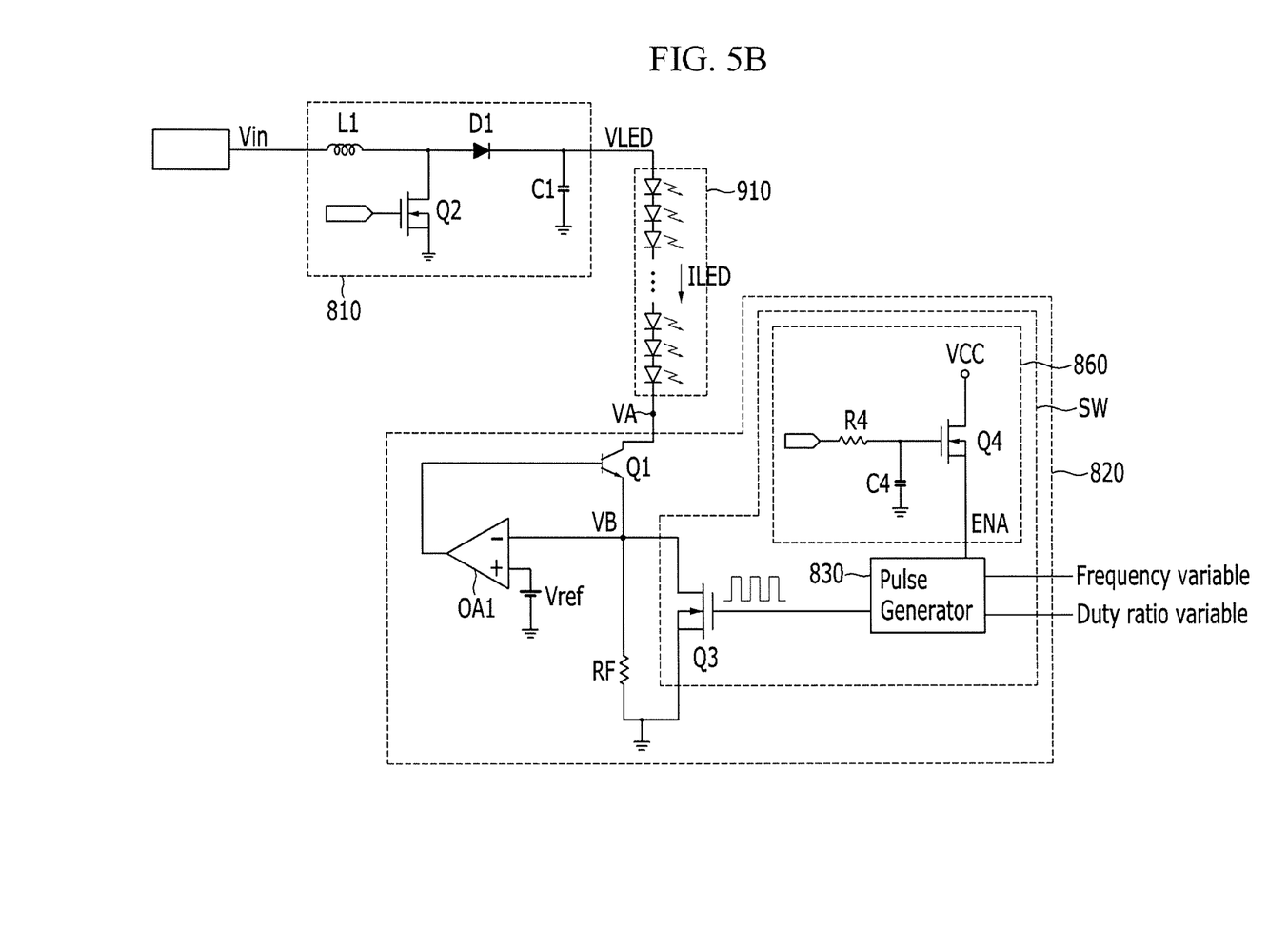

FIGS. 5A and 5B are circuit diagrams of a light emitting diode driver according to an exemplary embodiment of the present invention, respectively.

Referring to FIG. 5A or 5B, a light emitting device according to an exemplary embodiment of the present invention includes a light emitting diode driver 800 and a light emitting unit 900. The light emitting unit 900 includes one or more LED strings 910 which are connected in parallel to each other, and the light emitting diode driver 800 includes a DC-DC converter 810 and a constant current controller 820.

The DC-DC converter 810 may be a boost converter which receives an input voltage Vin which is a DC voltage and outputs a light emitting diode driving voltage VLED which is a relatively high DC voltage. The DC-DC converter 810 may include an inductor L1, a diode D1, a switching element Q2, and a capacitor C1.

Figure 6:
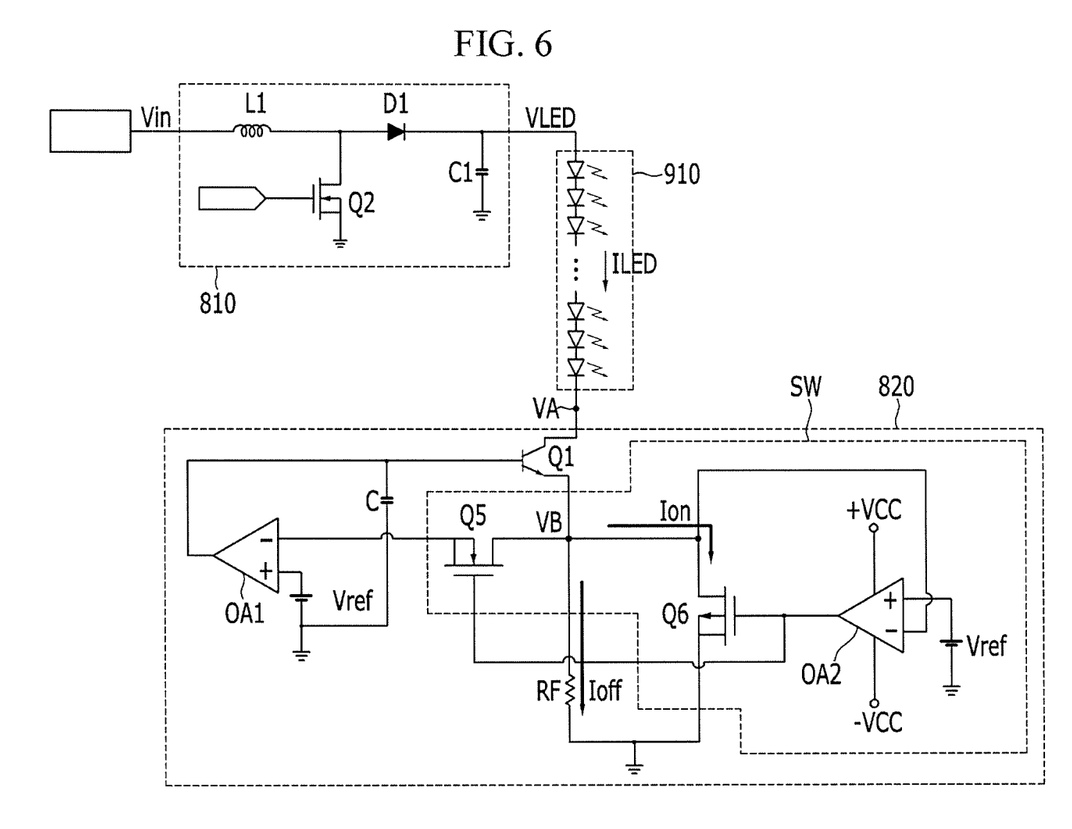

The switching element Q2 may be an MOSFET. FIG. 6 illustrates an NMOSTFET as an example, but is not limited thereto. The switching element Q2 is turned on/off according to a control signal input to a gate thereof, and the light emitting diode driving voltage VLED is generated according to magnetic energy of the inductor L1 generated according to the turned on/off control signal and charge energy of the capacitor C1.

An anode terminal of the LED string 910 receives the light emitting diode driving voltage VLED from the DC-DC converter 810.

The constant current controller 820 may include a transistor Q1 connected to a cathode terminal of each LED string 910, an operational amplifier OA1, a sensing resistor RF, and a switching unit SW, as described above.

The transistor Q1, the operational amplifier OA1, and the sensing resistor RF may be substantially the same as those described above in connection with FIGS. 1 to 4.

The switching unit SW according to an exemplary embodiment of the present invention may be configured by various methods. FIGS. 5A and 5B, respectively, illustrate different configurations of the switching unit SW according to exemplary embodiments of the present invention.

Referring to FIG. 5A or 5B, the switching unit SW includes a switching element Q3 connected in parallel to the sensing resistor RF between the emitter of the transistor Q1 and the ground voltage terminal. The switching element Q3 may be an NMOSFET, but is not limited thereto.

The constant current controller 820 may control or might not control the constant current of the LED string 910 according to the on/off of the switching element Q3. For example, when the switching element Q3 is turned off, the driving current ILED flows to the sensing resistor RF, and the voltage VB of the emitter of the transistor Q1 is input to the operational amplifier OA1 and thus the constant current controlling period P1 proceeds. When the switching element Q3 is turned on, the driving current ILED flows to the ground voltage terminal through the switching element Q3 and does not flow to the sensing resistor RF. Accordingly, the constant current control through feedback of the voltage of the sensing resistor RF stops, and the constant current not-controlling period P2 starts. The voltage VA at the cathode terminal of the LED string 910 which is determined in the previous constant current controlling period P1 may be substantially maintained in the constant current not-controlling period P2.

Referring to FIG. 5A, the switching unit SW according to an exemplary embodiment of the present invention may further include a pulse generator 830 applying a control signal to the gate of the switching element Q3, and an external pulse width modulator 840.

The pulse generator 830 may generate a periodical pulse based on frequency information and duty ratio information. The pulse generator 830 may receive the frequency and duty ratio information from an outside circuit (not shown), and the frequency and the duty ratio may be controlled to a predetermined value.

The external pulse width modulator 840 may output a signal synchronized with a dimming signal from a dimming controller (not illustrated).

The output of the pulse generator 830 and the output of the external pulse width modulator 840 are input to an AND gate 850, and the output of the AND gate 850 may be input to the gate of the switching element Q3. The on/off of the switching element Q3 may be controlled according to the output of the AND gate 850.

For example, the external pulse width modulator 840 may output the dimming signal described above in connection with FIG. 4. In this case, when the dimming signal is turned on through the AND gate 850, the periodical pulse of the pulse generator 830 may be input to the gate of the switching element Q3. Accordingly, when the dimming signal is turned on, and the pulse generated in the pulse generator 830 is at a high level, the switching element Q3 is turned on, and thus, the driving current ILED does not flow to the sensing resistor RF, but flows to the ground voltage terminal. When the pulse generated in the pulse generator 830 is at a low level, the switching element Q3 is turned off, and accordingly, the driving current ILED may flow to the sensing resistor RF. For example, when the dimming signal is turned on, the constant current controlling period P1 and the constant current not-controlling period P2 may alternately proceed.

Alternatively, the external pulse width modulator 840 and the AND gate 850 may be omitted.

Referring to FIG. 5B, the light emitting diode driver 800 according to an exemplary embodiment is substantially the same as the light emitting diode driver 800 illustrated in FIG. 5A, except for the switching unit SW.

The switching unit SW according to an exemplary embodiment of the present invention may include a switching element Q3 connected in parallel to the sensing resistor RF between the emitter of the transistor Q1 and the ground voltage terminal, a pulse generator 830 applying a control signal to the gate of the switching element Q3, and a power input unit 860.

The pulse generator 830 may generate a periodical pulse based on frequency information and duty ratio information. The pulse generator 830 may receive the frequency and duty ratio information from an outside circuit (not shown), and the frequency and the duty ratio may be controlled to a predetermined value.

The power input unit 860 may input power to an enable terminal ENA of the pulse generator 830. The power input unit 860 according to an exemplary embodiment of the present invention may include a switching element Q4 connected between the pulse generator 830 and a terminal of a power voltage VCC. The switching element Q4 may be an NMOSFET, but is not limited thereto. A control signal synchronized with the dimming signal may be input to the gate to the switching element Q4. For example, the control signal having the same phase as the dimming signal is input to the gate of the switching element Q4, and thus when the dimming signal is turned on, the switching element Q4 is turned on, and thus, the power voltage VCC may be input to the pulse generator 830.

A resistor R4 and a capacitor C4 may be further connected to the gate of the switching element Q4.

According to an exemplary embodiment of the present invention, when the dimming signal is turned on, the power voltage VCC is supplied to the pulse generator 830 through the switching element Q4 and thus the pulse generator 830 may operate. For example, when the dimming signal is turned on, the constant current controlling period P1 and the constant current not-controlling period P2 may alternately proceed.

FIG. 6 is a circuit diagram of a light emitting diode driver according to an exemplary embodiment of the present invention.

Referring to FIG. 6, a light emitting device according to an exemplary embodiment of the present invention includes a light emitting diode driver 800 and a light emitting unit 900. The light emitting unit 900 includes one or more LED strings 910 which are connected in parallel to each other, and the light emitting diode driver 800 includes a DC-DC converter 810 and a constant current controller 820.

The DC-DC converter 810 may be substantially the same as the DC-DC converter 810 described above in connection with FIGS. 1 to 5B.

The constant current controller 820 may include a transistor Q1 connected to a cathode terminal of each LED string 910, an operational amplifier OA1, a sensing resistor RF, and a switching unit SW.

The description of the transistor Q1, the operational amplifier OA1, and the sensing resistor RF may be substantially the same as those described above in connection with FIGS. 1 to 5B.

The switching unit SW according to an exemplary embodiment of the present invention may be configured by various methods, and FIG. 6 illustrates a configuration of the switching unit SW according to an exemplary embodiment of the present invention.

Referring to FIG. 6, the switching unit SW may allow current through flow through the sensing resistor RF and switch the constant current control when the voltage VB at the emitter of the transistor Q1 is compared with a predetermined voltage range or a predetermined voltage and departs from the predetermined voltage range or is different from the predetermined voltage.

FIG. 6 illustrates an example in which the switching unit SW performs the constant current control when the voltage VB at the emitter of the transistor Q1 is different from the predetermined voltage, for example, the reference voltage Vref.

Referring to FIG. 6, the switching unit SW may include a switching element Q5 connected between the emitter of the transistor Q1 and the operational amplifier OA1, a switching element Q6 connected in parallel with the sensing resistor RF between the emitter of the transistor Q1 and the ground voltage terminal, and an operational amplifier OA2 having an output terminal connected to the gate of the switching element Q6.

The switching elements Q5 and Q6 may be NMOSFETs, and channel types of the switching element Q5 and the switching element Q6 may be opposite to each other. For example, in an exemplary embodiment of the present invention, the switching element Q5 may be the NMOSFET, and the switching element Q6 may be a PMOSFET.

The operational amplifier OA2 functions as a comparator and includes a non-inversion terminal (+) through which the reference voltage Vref is received and an inversion terminal (−) connected to the emitter of the transistor Q1.

When the voltage VB at the emitter of the transistor Q1 is the same as the reference voltage Vref, an output voltage of the operational amplifier OA2 becomes a low voltage −VCC and thus the switching element Q6 which is a PMOSTFET is turned on, and the switching element Q5 which is an NMOSTFET is turned off. Accordingly, an on-current Ion flows through the switching element Q6, and does not flow through the sensing resistor RF. Accordingly, the constant current not-controlling period P2 starts.

When the on-current Ion flows through the switching element Q6, the driving current ILED may be maintained constant for a predetermined time by the voltage charged in the capacitor C connected to the base of the transistor Q1.

When the voltage VB at the emitter of the transistor Q1 is increased or decreased, and thus, is rendered different from the reference voltage Vref, an output voltage of the operational amplifier OA2 turns into a high voltage +VCC and thus the switching element Q6 which is a PMOSTFET is turned off, and the switching element Q5 which is an NMOSTFET is turned on. Accordingly, an off-current Ioff, e.g., the driving current ILED flows to the sensing resistor RF and thus the constant current controlling period P1 starts.

According to an exemplary embodiment of the present invention, the switching elements Q5 and Q6 are periodically or aperiodically turned on/off according to a change in the voltage VB at the emitter of the transistor Q1 and control the driving current ILED in real time.

According to an exemplary embodiment of the present invention, a Schmitt trigger (not illustrated) may be connected to the gate of the switching element Q6 instead of the operational amplifier OA2 illustrated in FIG. 6. In this case, the Schmitt trigger determines whether the voltage VB of the emitter of the transistor Q1 is in a predetermined voltage range, for example, a range between two reference voltages or departs from the predetermined voltage range and controls the on/off of the switching elements Q5 and Q6.

The light emitting diode driver 800 and the light emitting unit 900 according to an exemplary embodiment may be included in various display devices.

Figure 7:
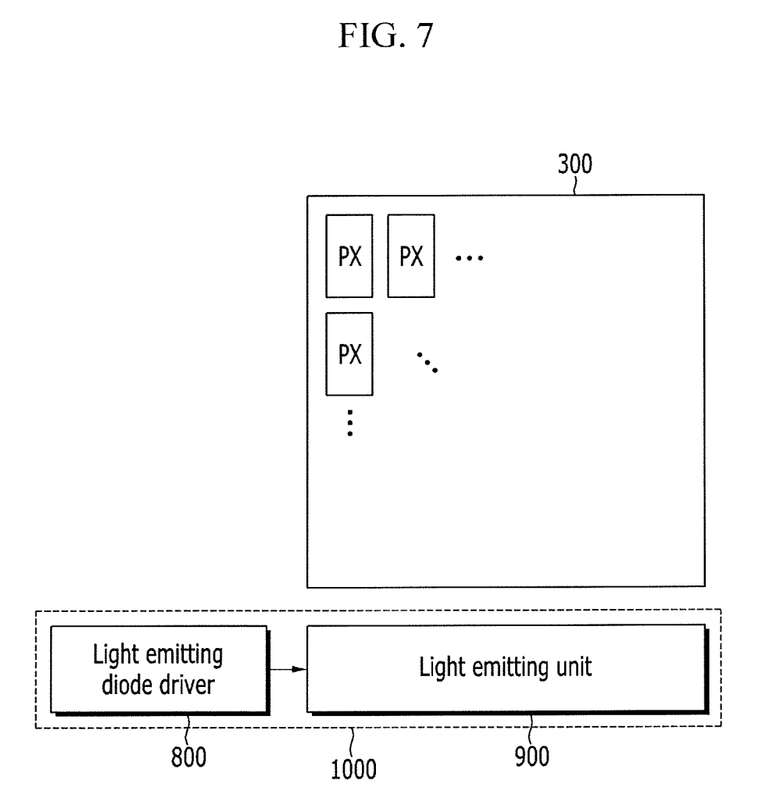
FIG. 7 is a block diagram of a display device including a light emitting device according to an exemplary embodiment of the present invention.

FIG. 7 is a block diagram of a display device including a light emitting device according to an exemplary embodiment of the present invention.

Referring to FIG. 7, a display device according to an exemplary embodiment of the present invention may be a non-emission display device, such as an liquid crystal display (LCD). The display device includes a display panel 300 including a plurality of pixels PX and a backlight unit 1000. The backlight unit 1000 may include the light emitting unit 900 and the light emitting diode driver 800 according to an exemplary embodiment described above.

While this invention has been shown and described in connection with exemplary embodiments thereof, it is to be understood by one of ordinary skill in the art that various changes in form and detail may be made thereto without departing from the spirit and scope of the invention as defined by the following claims.

What is claimed is:
1. A light emitting device, comprising:
   a light emitting unit including at least one LED string; and
   a constant current controller connected to a cathode terminal of the LED string, the constant current controller configured to control a driving current flowing through the LED string, wherein the constant current controller includes a transistor connected to the cathode terminal of the LED string, and a switching unit and a sensing resistor that are connected to the transistor, wherein the switching unit is configured to connect the transistor to a ground voltage terminal through the sensing resistor during a first period and directly connect the transistor to the ground voltage terminal during a second period.

2. The light emitting device of claim 1, wherein the constant current controller further includes a first operational amplifier including an output terminal connected to a base of the transistor.

3. The light emitting device of claim 2, wherein the first operational amplifier further includes an inversion terminal connected to an emitter of the transistor and a non-inversion terminal connected to a reference voltage terminal.

4. The light emitting device of claim 3, wherein the switching unit includes a first switching element connected between the emitter of the transistor and a ground voltage terminal.

5. The light emitting device of claim 4, wherein the switching unit further includes a pulse generator periodically applying a pulse signal to a gate of the first switching element.

6. The light emitting device of claim 5, wherein the switching unit further includes an AND gate receiving the pulse signal from the pulse generator and a signal synchronized with a dimming signal from an external pulse width modulator, and wherein an output of the AND gate is input to the gate of the first switching element.

7. The light emitting device of claim 5, wherein the switching unit further includes a power input unit applying a power voltage to the pulse generator, wherein the power input unit includes a second switching element connected to the pulse generator, and wherein a control signal synchronized with a dimming signal is input to a gate of the second switching element.

8. The light emitting device of claim 3, further comprising a DC-DC converter applying a driving voltage to an anode terminal of the LED string.

9. The light emitting device of claim 3, wherein the switching unit is configured to control a current to flow through the sensing resistor when a voltage at the emitter of the transistor departs from a predetermined voltage range or is different from a predetermined voltage.

10. The light emitting device of claim 9, wherein the switching unit includes,
a third switching element connected between the emitter of the transistor and the inversion terminal of the first operational amplifier;
a fourth switching element connected between the emitter of the transistor and a ground voltage terminal; and
a second operational amplifier having an output terminal connected to a gate of the fourth switching element.

11. The light emitting device of claim 10, wherein channel types of the third switching element and the fourth switching element are different from each other.

12. The light emitting device of claim 11, wherein a non-inversion terminal of the second operational amplifier is connected with the reference voltage terminal, and an inversion terminal of the second operational amplifier is connected to the emitter of the transistor.

13. The light emitting device of claim 12, wherein the third switching element is an NMOSFET, and the fourth switching element is a PMOSFET.

14. The light emitting device of claim 10, further comprising a DC_DC converter applying a driving voltage to an anode terminal of the LED string.

15. A method of driving a light emitting device having a light emitting unit including at least one LED string and a constant current controller, the method comprising:
enabling a driving current to flow through the LED string by applying a driving voltage to an anode terminal of the LED string;
performing a constant current control on the driving current during a first period, the current flows from the LED string to a ground voltage terminal through a sensing resistor; and
stopping the constant current control on the driving current during a second period, the current flows from the LED string to the ground voltage terminal directly, wherein the first period and the second period are alternately repeated.

16. The method of a light emitting device of claim 15, wherein the first period and the second period are periodically repeated.

17. The method of a light emitting device of claim 16, wherein the constant current controller includes a transistor connected to the cathode terminal of the LED string, and a switching unit and a sensing resistor that are connected to the transistor, and wherein a current flows through the sensing resistor during the first period, and the current does not flow through the sensing resistor during the second period.

18. The method of a light emitting device of claim 15, wherein the first period and the second period are aperiodically repeated.

19. The method of a light emitting device of claim 18, wherein the constant current controller includes a transistor connected to the cathode terminal of the LED string, and a switching unit and a sensing resistor that are connected to the transistor, and wherein a current flows through the sensing resistor during the first period, and the current does not flow through the sensing resistor during the second period.

20. A light emitting device, comprising:
a light source; and
a current controller including a transistor connected to a terminal of the light source, a sensing resistor, and a switching unit connected between the transistor and the sensing resistor, wherein the switching unit is configured to connect the transistor to a ground voltage terminal through the sensing resistor during a first period and connect the transistor to the ground voltage terminal directly during a second period depending on a dimming signal, the current controller is configured to enable a substantially constant current to flow through the light source regardless of whether the switching unit connects the transistor to the sensing resistor or the ground voltage terminal.

* * * * *